(12) United States Patent
Elkhouly et al.

(10) Patent No.: US 10,714,960 B2
(45) Date of Patent: Jul. 14, 2020

(54) UNIFORM WIRELESS CHARGING DEVICE

(71) Applicant: Intel Corporation, Santa Clara, CA (US)

(72) Inventors: Essam Elkhouly, Santa Clara, CA (US); Songnan Yang, San Jose, CA (US); Zhen Yao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/978,272

(22) Filed: Dec. 22, 2015

(65) Prior Publication Data

US 2017/0179751 A1     Jun. 22, 2017

(51) Int. Cl.
| | | |
|---|---|---|
| H02J 7/02 | (2016.01) | |
| H02J 7/04 | (2006.01) | |
| H02J 50/12 | (2016.01) | |
| H01F 38/14 | (2006.01) | |
| H02J 50/70 | (2016.01) | |

(52) U.S. Cl.
CPC .............. H02J 7/025 (2013.01); H01F 38/14 (2013.01); H02J 50/12 (2016.02); H02J 50/70 (2016.02)

(58) Field of Classification Search
CPC ...... H02J 7/025; H02J 7/04; H02J 7/02; H02J 5/005; H02J 5/00; H02J 17/00; H01F 38/14; H01F 27/28; H01F 27/2823; H01F 5/00; H01F 41/04
USPC .......................... 320/108; 307/104; 29/602.1
See application file for complete search history.

(56) References Cited

U.S. PATENT DOCUMENTS

| | | | | |
|---|---|---|---|---|
| 5,729,443 | A * | 3/1998 | Pavlin ................. | H02M 3/3381 363/21.12 |
| 2002/0185228 | A1* | 12/2002 | Chen ..................... | H01J 37/321 156/345.48 |
| 2004/0024301 | A1* | 2/2004 | Hockett ................ | A61B 5/055 600/407 |
| 2005/0183668 | A1* | 8/2005 | Lee ....................... | H01J 37/321 118/723 I |
| 2006/0089815 | A1* | 4/2006 | Moritani ................ | G04F 10/00 702/85 |
| 2006/0097918 | A1* | 5/2006 | Oshiyama .............. | H01Q 1/243 343/700 MS |
| 2008/0036606 | A1* | 2/2008 | Kuramoto ............ | G06K 7/0008 340/572.7 |

(Continued)

OTHER PUBLICATIONS

Search Report and Written Opinion dated Jan. 13, 2017 for PCT International Application No. PCT/US16/58434.

*Primary Examiner* — Richard Isla
*Assistant Examiner* — Dung V Bui
(74) *Attorney, Agent, or Firm* — Schiff Hardin LLP (57) ABSTRACT

In a wireless charging device that includes a resonator having coil windings, a magnetic field can be generated by the resonator. The wireless charging device can include a feed point connected to an inner winding of the coil windings of the resonator. The resonator can inductively couple with a power receiving unit such that the an outer winding of the coil windings limit Eddy current generation in one or more conductive surfaces positioned adjacent to the power receiving unit. The feed point can be selectively connected to the inner winding of the coil in a first mode of operation and the outer winding of the coil in a second mode of operation. The inner winding can have a larger current than the outer winding.

22 Claims, 9 Drawing Sheets

(56) References Cited

U.S. PATENT DOCUMENTS

| | | | |
|---|---|---|---|
| 2008/0231526 A1* | 9/2008 | Sato | H01P 1/15 343/722 |
| 2009/0096413 A1* | 4/2009 | Partovi | H01F 5/003 320/108 |
| 2011/0046438 A1* | 2/2011 | Iwaisako | A61B 1/00029 600/101 |
| 2011/0101788 A1* | 5/2011 | Sun | H01F 38/14 307/104 |
| 2012/0161532 A1 | 6/2012 | Ogawa et al. | |
| 2012/0161533 A1* | 6/2012 | Urano | H02J 17/00 307/104 |
| 2013/0069753 A1* | 3/2013 | Kurs | H01F 5/003 336/200 |
| 2013/0106420 A1* | 5/2013 | Overweg | G01R 33/3854 324/322 |
| 2013/0154384 A1* | 6/2013 | Nakamura | H01F 38/14 307/104 |
| 2013/0335018 A1* | 12/2013 | Ichikawa | B60L 11/182 320/108 |
| 2014/0111154 A1* | 4/2014 | Roy | G01V 3/081 320/108 |
| 2014/0159501 A1* | 6/2014 | Kanno | H01F 38/14 307/104 |
| 2014/0210406 A1 | 7/2014 | Na et al. | |
| 2014/0246919 A1* | 9/2014 | Hatanaka | H01F 38/14 307/104 |
| 2014/0325830 A1* | 11/2014 | Hatanaka | H02J 7/025 29/602.1 |
| 2014/0339915 A1* | 11/2014 | Kanno | H01F 38/14 307/104 |
| 2014/0354220 A1* | 12/2014 | Liu | H02J 50/10 320/108 |
| 2015/0130583 A1 | 5/2015 | Zheng et al. | |
| 2015/0170830 A1* | 6/2015 | Miyamoto | H02J 5/005 307/104 |
| 2015/0207333 A1* | 7/2015 | Baarman | H02J 5/005 307/104 |
| 2015/0303708 A1* | 10/2015 | Efe | H01F 27/2804 307/104 |
| 2015/0380949 A1* | 12/2015 | Hatanaka | H02J 50/12 307/104 |
| 2016/0012966 A1* | 1/2016 | Davis | H01F 38/14 307/104 |
| 2016/0012967 A1* | 1/2016 | Kurs | H02J 50/12 307/104 |
| 2016/0072306 A1* | 3/2016 | Tsuda | H02J 5/005 307/104 |

* cited by examiner

UNIFORM WIRELESS CHARGING DEVICE

BACKGROUND

Field

Aspects described herein generally relate to wireless charging, including power transmission coil configurations having increased coupling uniformity between power receiving coils and power transmission coils.

Related Art

Wireless charging or inductive charging uses a magnetic field to transfer energy between two devices. Wireless charging of a device can be implemented using charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery and/or power the device. In this manner, the two proximal induction coils form an electrical transformer. Greater distances between Transmitter and receiver coils can be achieved when the inductive charging system uses magnetic resonance coupling. Magnetic resonance coupling is the near field wireless transmission of electrical energy between two coils that are tuned to resonate at the same frequency.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Position flexibility and multi-device charging are differentiating features of A4WP based wireless charging system. Coupling uniformity between the PRU and PTU can affect the positional flexibility and the charging of multiple devices. For small devices (e.g., wearables, smart watches, smart phones, media players) where the size of the PRU resonators is close to the size of the entire device, uniform coupling may be achieved by creating a PTU resonator that offers uniform magnetic field in the charging area.

However, for large devices such as tablets and notebooks, the PRU coil may only cover a portion of the device. The device chassis and metallic components inside the device can modulate the coupling between the PTU and PRU coil. As a result, magnetic coupling can vary significantly depending on the relative positions (i.e., overlap) of the PTU and PRU. This holds true even when the PTU coil provides a substantially uniform magnetic field.

Figure 1A:
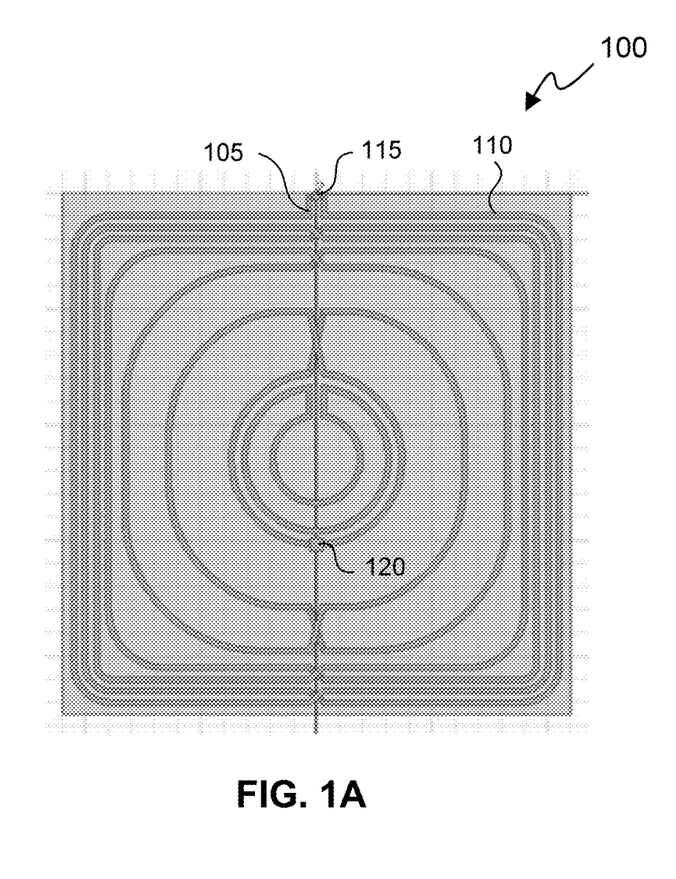
FIG. 1A illustrates an example wireless power transmission coil.
Figure 1B:
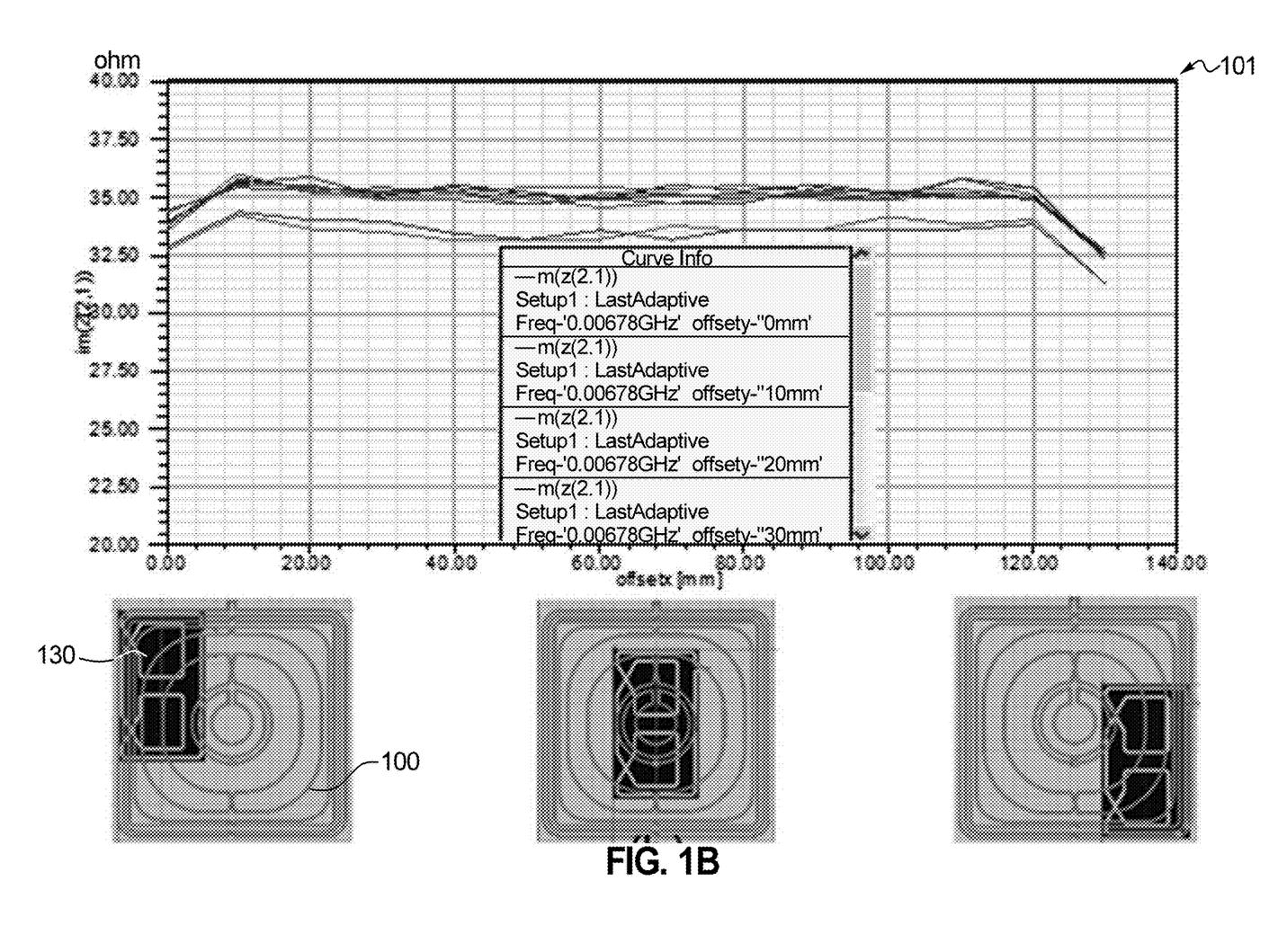
FIG. 1B illustrates coupling variation at different relative position between a receiver coil and the coil of FIG. 1A.

FIG. 1A illustrates a Power Transmitting Unit (PTU) coil 100. The PTU coil 100 includes a feed point 105 that feeds coil windings of a resonator 110. The PTU coil 100 can include one or more tuning capacitors 115 at the feed point 105. The PTU coil 100 can also include one or more in-line capacitors 120. In operation, the PTU coil 100 can provide a substantially uniform magnetic field within a coil area defined by the coil windings of the resonator 110. For example, as shown in FIG. 1B, the coupling is uniform when a Power Receiving Unit (PRU) coil 130 scans through the surface of the PTU coil 100 (e.g., left to right in FIG. 1B). For the purpose of this disclosure, coupling is measured as mutual impedance (e.g., "im(Z(2,1)" in FIGS. 1B and 2B, and "Z21" in FIG. 7).

With reference to FIG. 1B, the mutual impedance plots 101 illustrate the coupling at various relative positions of the PRU coil 130 and the PTU coil 100. In this example, the x-axis illustrates the offset in millimeters, where a zero offset is the left edge of the PTU coil 100 and increases from left to right. For example, in FIG. 1B, the PRU coil 130 has an offset of 0 mm when positioned along the left edge of the PTU coil 100, a 75 mm offset when positioned in the center of the PTU coil 100, and an offset of 130 mm when positioned along the right edge of the PTU coil 100. Similarly, the impedance plots 101 correspond to the vertical position of the PRU coil 130 with respect to the PTU coil 100, where the top edge of the PTU coil 100 in FIG. 1B is a zero mm offset and the bottom edge has an offset of 135 mm. That is, a X-Y coordinate system can be defined on the PTU coil 100, where the (0,0) coordinate is the upper left corner of the PTU coil 100 and the lower right corner of the PTU coil 100 is the (135, 135) coordinate.

Figure 2A:
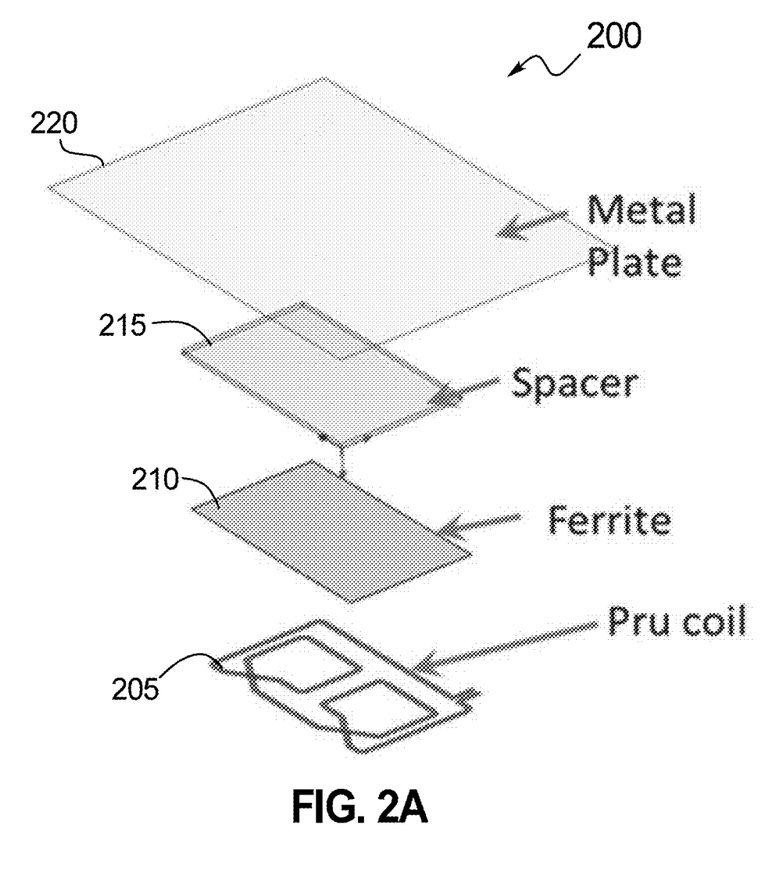
FIG. 2A illustrates an exploded view of a resonator interoperability tester (RIT) assembly with metal plate backing.

FIG. 2A illustrates an example Resonator Interoperability Tester (RIT) 200. The RIT 200 includes a coil 205, a ferrite layer 210, a spacer layer 215, and a metal layer 220. The metal layer 220 can be configured to emulate a metal chassis as used in conventional tablets, laptops, etc. In this example, the coil 205 can represent a PRU coil. The components of the RIT 200 can be arranged in an layered configuration with the in the ferrite layer 210 disposed on the coil 205, the spacer layer disposed on the ferrite layer 210, and the metal layer 200 disposed on the spacer layer 215.

Figure 2B:
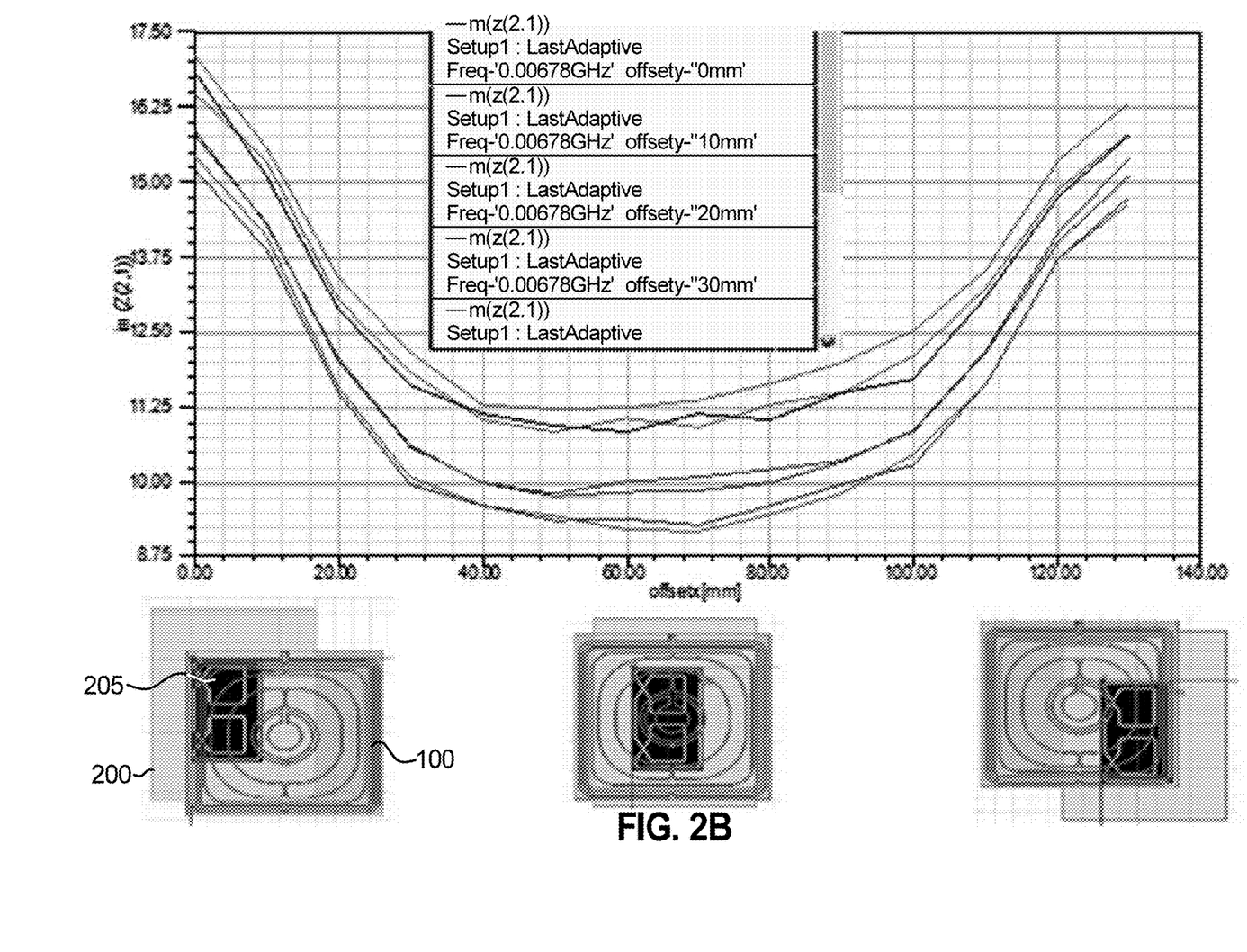
FIG. 2B illustrates coupling variation caused by the relative position of the RIT and a PTU.

As illustrated in FIG. 2B, as the RIT 200 is moved across the active area of, for example, the PTU coil 100, the coupling varies depending on the overlap between the PTU 100 and the coil 205 of the RIT 200. In this example, the mutual impedance reaches its maximum point when the RIT 200 partially overlaps the PTU coil 100 (e.g., when the RIT 200 is positioned on the left or right edges of the PTU 100). The mutual impedance reaches a minimum point as the metal plate 220 of the RIT 200 aligns with the center of the PTU coil 100 and fully covers the entire active area (i.e., the middle figure of FIG. 2B). The uneven coupling can cause challenges in the certification of a PTU design and PRU integration solutions for interoperability. In this example, the coupling variations are caused by Eddy currents generated on the metal plate 220 (see FIGS. 3A-3C) that occur in reaction to the magnetic field applied to the PRU coil 205 of the RIT 200.

Figure 3A:
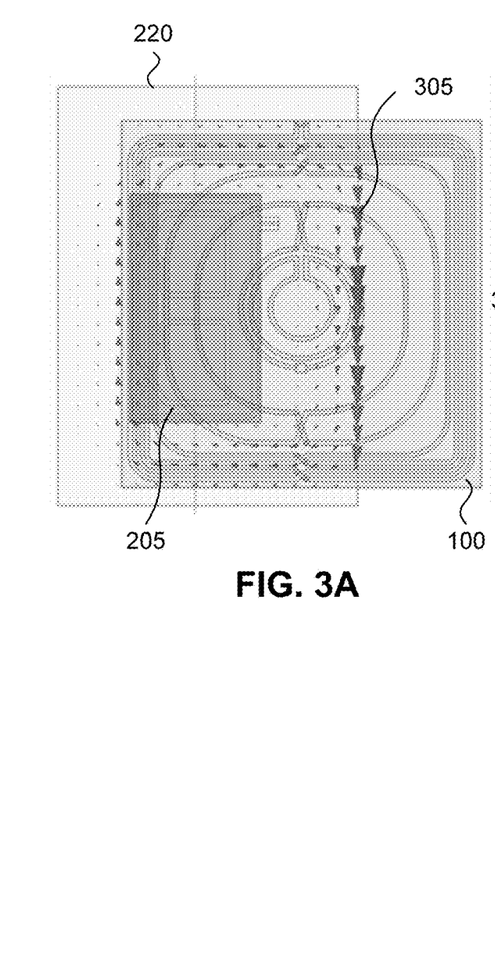
FIG. 3A illustrates Eddy currents on a metal plate when the PRU is positioned to the left of the PTU's center.
Figure 3B:
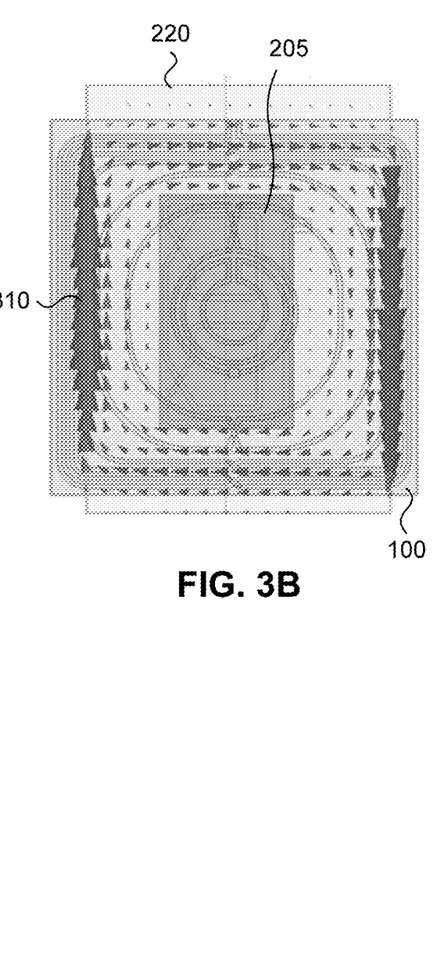
FIG. 3B illustrates Eddy currents on a metal plate when the PRU is positioned to the center of the PTU.
Figure 3C:
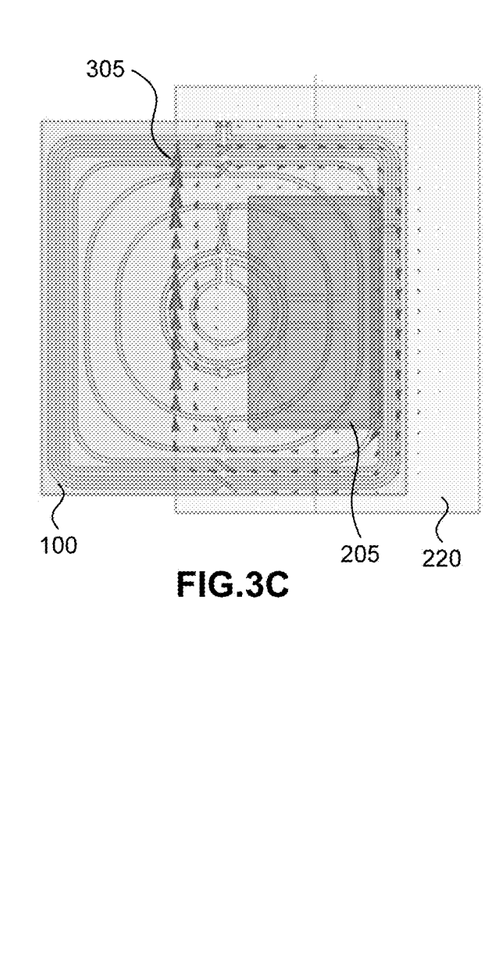
FIG. 3C illustrates Eddy currents on a metal plate when the PRU is positioned to the right of the PTU's center.

As illustrated in FIGS. 3A and 3C, when the RIT 200 partially overlaps the PTU coil 100, the generated Eddy current 305 is small and has little or no impact on the PRU/PTU coupling. As illustrated in FIG. 3B, when the PTU coil 100 and the RIT 200 fully overlap (i.e., the RIT 200 is centered on the PTU coil 100), larger Eddy currents 310 are generated along the edges of the metal plate 220 of the RIT 200 around the PRU coil 100. The larger Eddy currents 310 can cancel (or otherwise interfere with) a significant portion of the magnetic field generated by the PTU coil 100 and can lead to significant coupling deterioration.

Figure 4A:
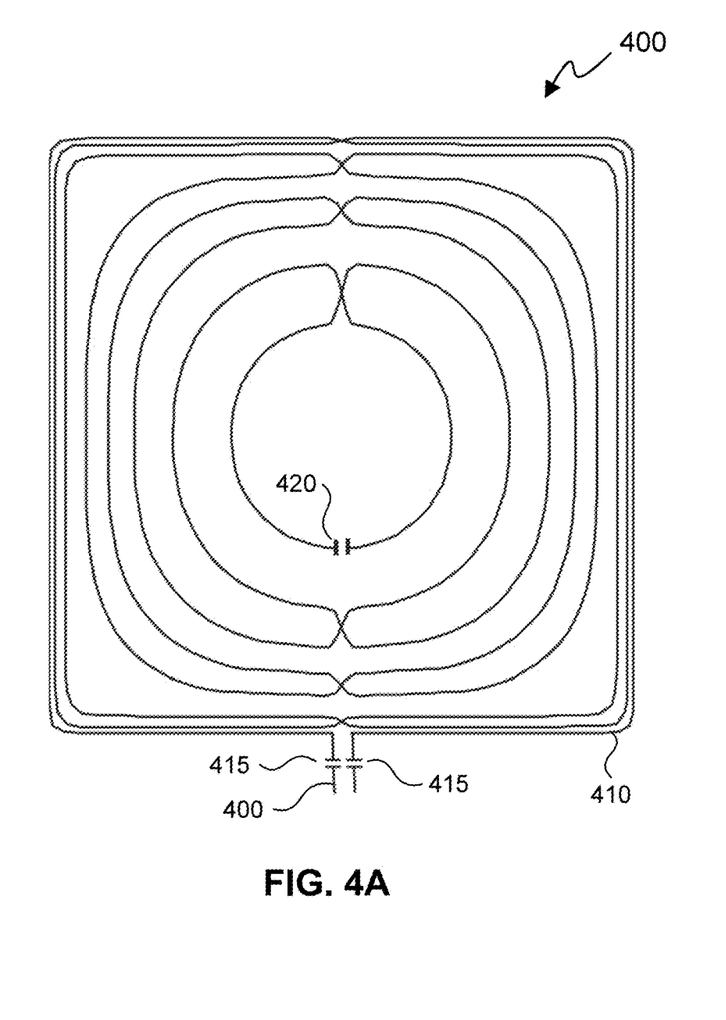
FIG. 4A illustrates an example wireless power transmission coil.

FIG. 4A illustrates a PTU coil 400. The PTU coil 400 includes a feed point 405 that feeds coil windings of resonator 410. The PTU coil 400 can include one or more tuning capacitors 415 at the feed point 405. The PTU coil 400 can also include one or more in-line capacitors 420. In operation, the PTU coil 400 can provide a substantially uniform magnetic field within a coil area defined by the coil windings of the resonator 410.

Figure 4B:
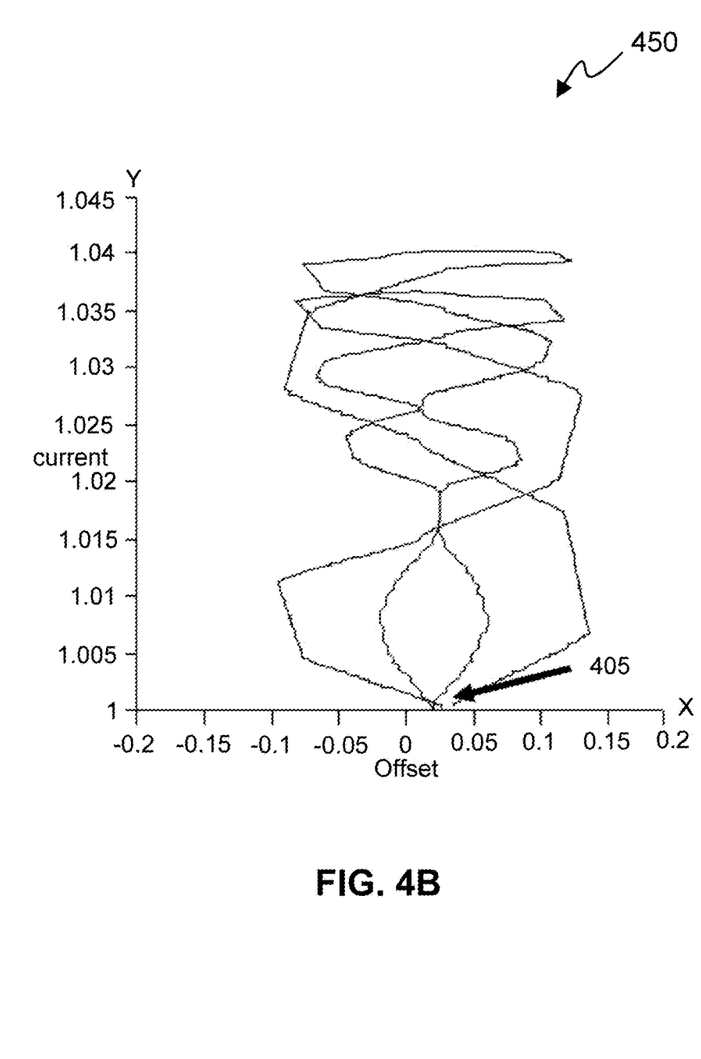
FIG. 4B illustrates a current distribution among turns of the coil of FIG. 4A.

FIG. 4B illustrates a current distribution 450 among turns of the coil of the resonator 410 of the PTU coil 400 of FIG. 4A. Is this example, the x-axis illustrates the offset distance of the portions of the coil 410 with respect to the feed 405 of the PTU 400, where the feed 405 is at zero. The y-axis illustrates the normalized current in amperes.

Figure 5A:
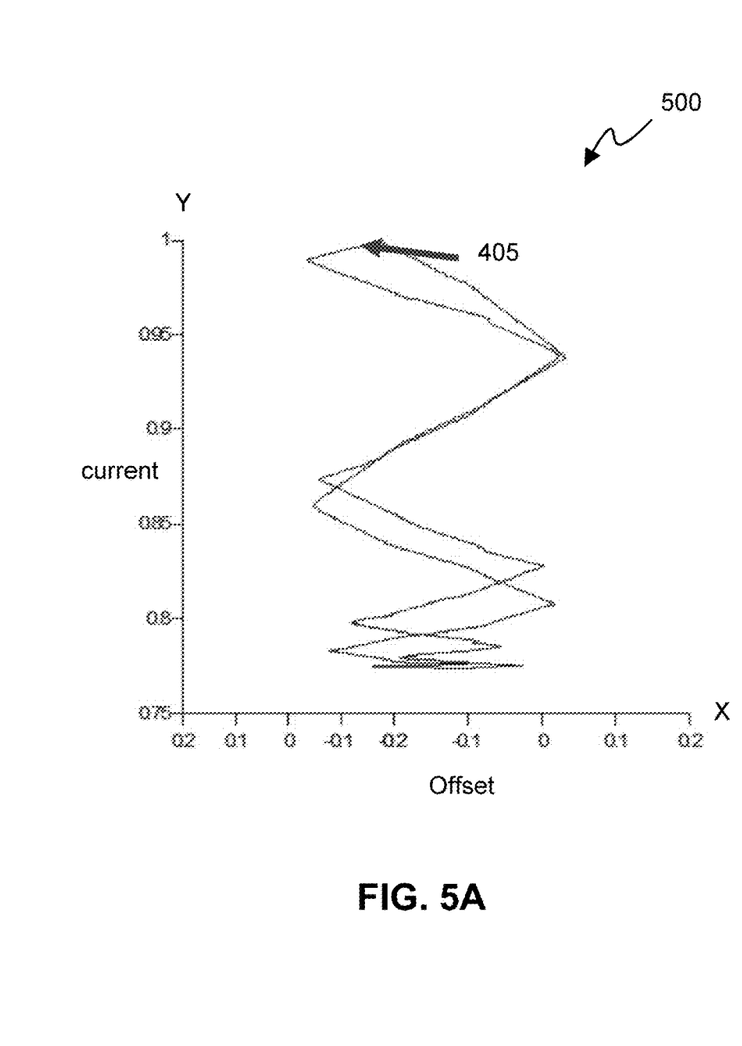
FIG. 5A illustrates a current distribution among turns of the coil of FIG. 4A that includes a metal cover adjacent to the coil.

FIG. 5A illustrates a current distribution 500 among turns of the coil windings of the resonator 410 of the PTU coil 400 of FIG. 4A that includes a conductive surface (e.g., metal plate 525) disposed adjacent to the PTU coil 400. Similarly, the x-axis illustrates the offset distance of the coil windings of the resonator 410 with respect to the feed 405 of the PTU 400, where the feed 405 is at zero. The y-axis illustrates the normalized current in amperes.

Figure 5B:
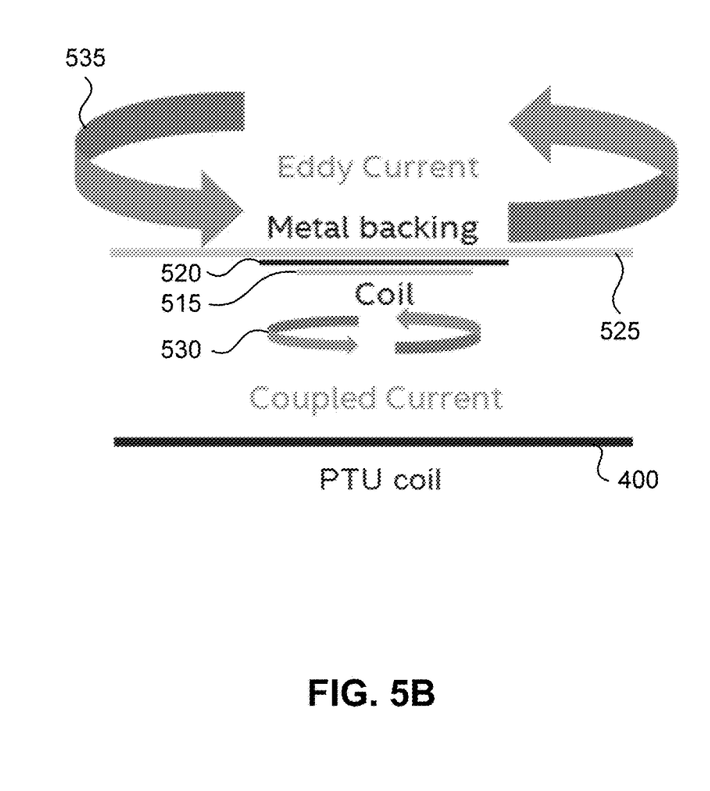
FIG. 5B schematically illustrates an example coil arrangement having an adjacent metal cover.

An example arrangement of the PTU coil 400 and PRU coil 515 having a metal enclosure (represented by metal plate 525) is illustrated in FIG. 5B. In this example, metal plate 525 is disposed on PRU coil 515, with a ferrite layer 520 disposed between the metal plate 525 and the PRU coil 515. The metal plate 525 can emulate a metal enclosure of a device that houses the PRU coil 515. In operation, coupling current 530 is generated in the PTU coil 400. The coupling current 530 refers to the current term that is spatially adjacent (e.g., spatially nearest) to the PRU coil 515. Eddy currents 535 are generated on the metal plate 525 in reaction to the magnetic field applied to the PRU coil 515.

With reference to FIG. 5A, the Eddy currents generated in the metal plate 525 reduce the current of the windings of the PTU coil 400. For example, the current at the center of the coil (e.g., the midpoint of the resonator 410) reduces by approximately 25% as compared to the current at the feed 405 of the PTU coil 400. In operation, the Eddy current generated in the metal plate 525 can reduce the inductance of PTU coil 400 and thereby increasing the impedance of the in-line capacitor 420. This increased impedance at the center of the PTU coil 400 reduces the current at the center of the PTU coil 400. The relationship between the inductance and the capacitance of the PTU coil 400 is illustrated in the following equations:

$$C_i = \frac{C_t}{2}$$

$$j\omega L + \frac{1}{j\omega(C_i + C_t)} = 0$$

where $C_i$ is the in-line capacitance of the in-line capacitor 420, $C_t$ is the total capacitance of the tuning capacitor(s) 415, L is the inductance of the PTU coil 400, $\omega = 2\pi f$, where f is the frequency, and $j = \sqrt{-1}$.

Figure 6A:
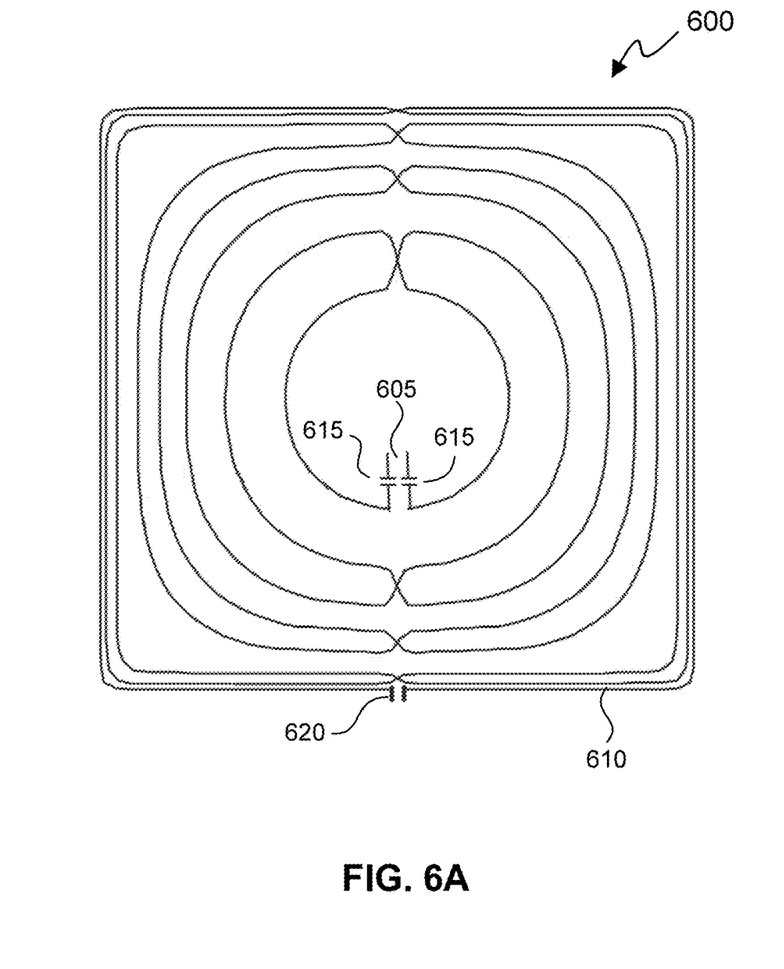
FIG. 6A illustrates a wireless power transmission coil according to an exemplary aspect of the present disclosure.

FIG. 6A illustrates a PTU coil 600 according to an exemplary aspect of the present disclosure. The PTU coil 600 includes a feed point 605 that feeds the coil windings of resonator 610. The coil windings of the resonator 610 can be concentrically or substantially concentrically arranged. The PTU coil 600 can include one or more tuning capacitors 615 at the feed point 605. The PTU coil 600 can also include one or more in-line capacitors 620. In the PTU coil 600, the feed point 605 and corresponding tuning capacitor(s) 615 are located in the center of the PTU coil 600 instead on the exterior of the coil as in the PTU coil 400 of FIG. 4A. Further, the in-line capacitors 620 are located on the exterior of the PTU coil 600 instead of in the center of the coil as in the PTU coil 400 of FIG. 4A.

In operation, the center feed configuration of the PTU coil 600 generates and maintains an increased current in the center of the PTU coil 600 while the in-line capacitor 620 creates a high-impedance path along the outer turns of the resonator 610 of PTU coil 600. In this example, the high-impedance path along the outer turns of the resonator 610 reduces the current along the outer turns of the resonator 610. This reduced current induces less Eddy current on an adjacent conductive surface (e.g., metal enclosure) while maintaining a large current on the interior of the PTU coil 600 to enhances the coupling of the PTU coil 600. That is, the PTU coil 600 enhance coupling at the center of the PTU coil 600 while reducing the effects of Eddy currents on the coupling of the PTU coil 600.

Figure 6B:
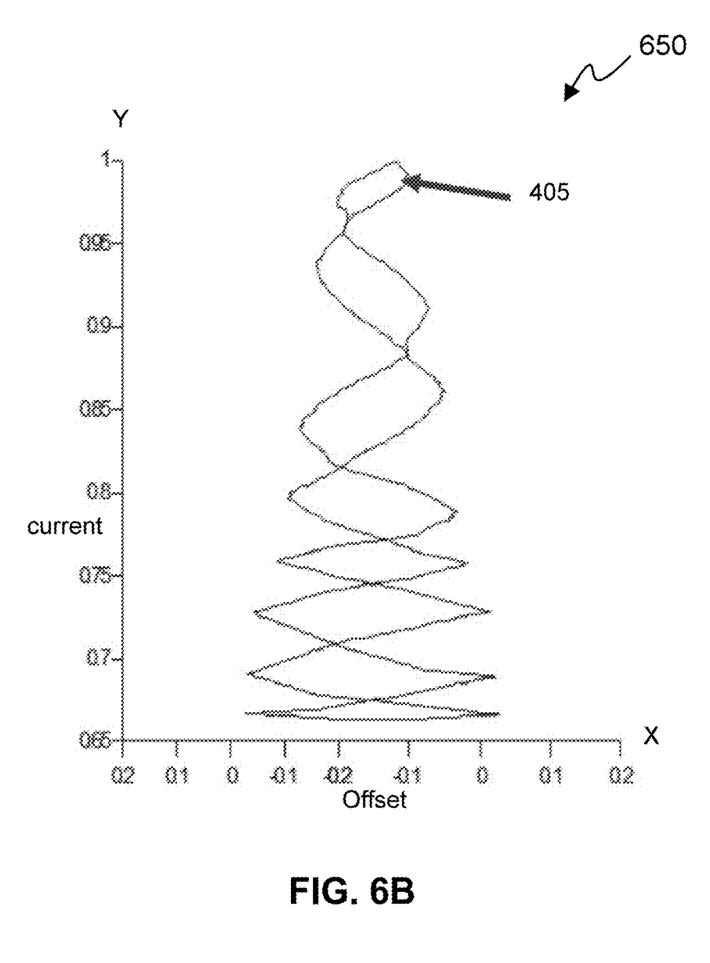
FIG. 6B illustrates a current distribution among turns of the coil of FIG. 5A.

FIG. 6B illustrates a current distribution 650 among turns of the resonator 610 of the PTU coil 600 of FIG. 6A when a conductive surface (e.g., metal plate) is disposed adjacent to the PTU coil 600. Is this example, the x-axis illustrates the offset distance of the portions of the resonator 610 with respect to the feed 605 of the PTU 600, where the feed 605 is at zero. The y-axis illustrates the normalized current in amperes. As illustrated in FIG. 6B, the current along the interior windings of the resonator 610 remains large while the outer windings of the resonator 610 have a current reduced by, for example, as much as approximately 35%.

In an exemplary aspect, the PTU coil 600 can be configured to have a selectable feed point. In operation, the PTU coil 600 can be selectively configured to have a center feed point at feed point 605 in a first mode of operation, an exterior feed point (such as illustrated in the PTU coil 400 of FIG. 4A) in a second mode of operation, and both a center feed point and an exterior feed point in a third mode of operation. In this example, the exterior feed point is configured as an in-line capacitor in the first mode of operation and the interior feed point 605 is configured as an inline capacitor in the second mode of operation.

In an exemplary aspect, the feed point mode of operation of the PTU coil 600 can be selected based on one or more variables, including, for example, current and/or voltage of the PTU coil 600, current and/or voltage generated by the PRU coil, the mutual impedance, and/or one or more other characteristics as would be by understood by one of ordinary skill in the relevant arts.

In an exemplary aspect, the feed point mode of operation of the PTU coil 600 can be selected based on one or more control signals. In this example, a controller can be configured to generate the control signals based on one or more variables, including, for example, current and/or voltage of the PTU coil 600, current and/or voltage generated by the PRU coil, the mutual impedance, and/or one or more other characteristics as would be by understood by one of ordinary skill in the relevant arts.

In exemplary aspects, the controller can be included in the PTU coil 600 or externally located (e.g., within a device housing the PTU coil 600) and in communication with the PTU coil 600, or a combination of both. The controller can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to generate the control signal(s). Alternatively or additionally, the processor can access an internal and/or external memory to retrieve instructions stored in the memory, which when executed by the processor, perform the corresponding function(s) of the controller. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Figure 7:
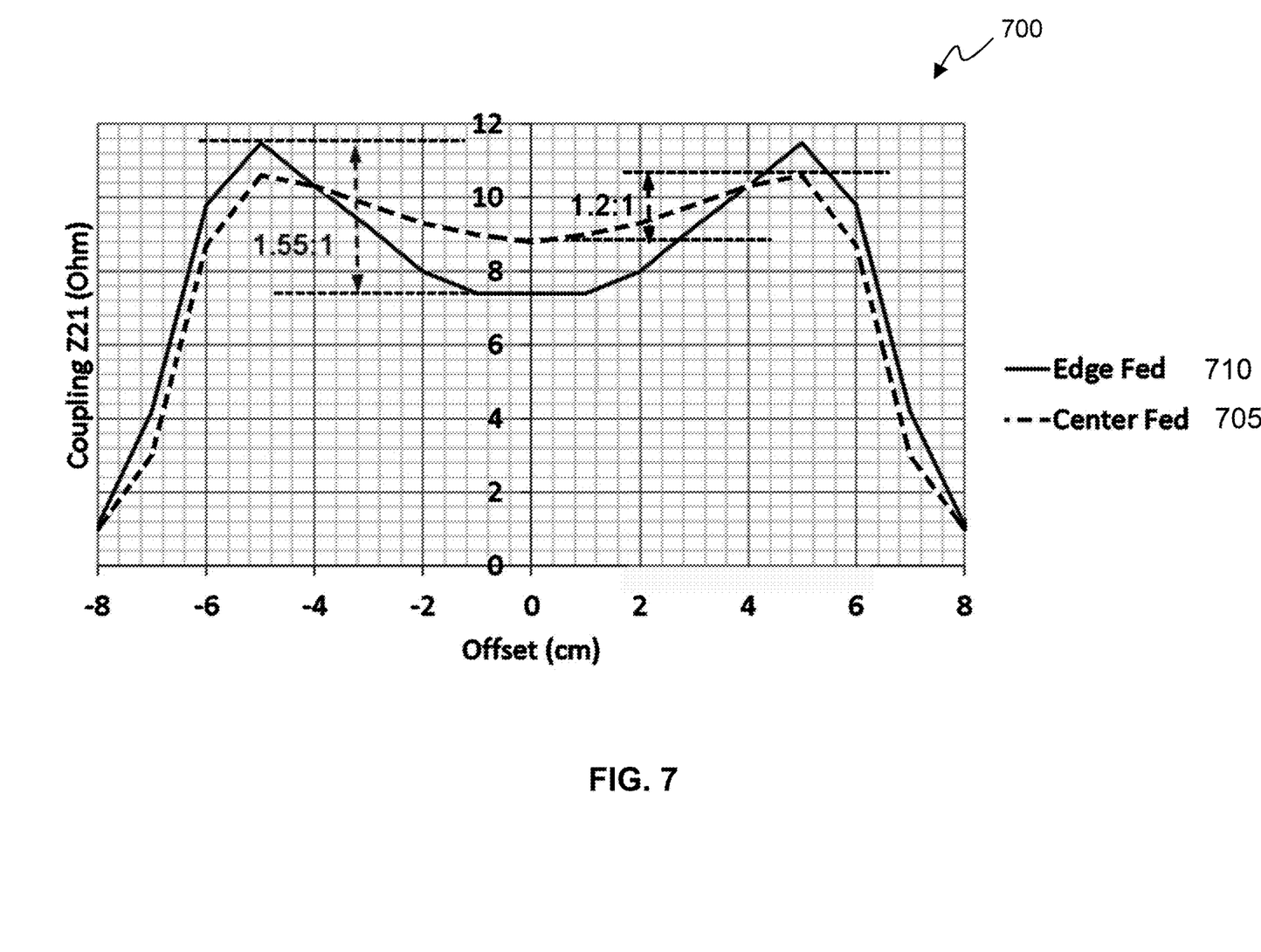
FIG. 7 illustrates coupling variations of edge and center fed coils according to an exemplary aspect of the present disclosure.

FIG. 7 illustrates coupling variations 700 of edge and center fed coils according to an exemplary aspect of the present disclosure. As shown in FIG. 7, the mutual impedance 705 of a center-feed coil configuration, such as PTU coil 600, has a coupling ratio of 1.2:1. The mutual impedance 710 of an edge-feed coil configuration, such as PTU coil 400, has a coupling ratio of 1.55:1. In these examples, the coupling ratio is a minimum coupling to maximum coupling ratio within the active coupling area of the coil. As illustrated in FIG. 7, a center-feed coil configuration, such as PTU coil 600, provides a more uniform coupling in devices that include large conductive surfaces (e.g., metal chassis or enclosure).

In an exemplary aspect, the PTU coil 600 can be combined with one or more PRU coil integration techniques. For example, the PRU coil structure can include a patterned conductive layer that is positioned between an external PTU coil and the coil element of the PRU coil. In this example, the added conductive layer (e.g., patterned front cover) may be positioned in front of the coil element of the PRU coil. In some aspects, the conductive layer is substantially similar in size and shape as the device housing PRU coil. The patterned conductive layer may optionally include a strategic pattern thereon. The pattern may be configured to modify and redirect the Eddy currents and compensate for the coupling variations.

In exemplary aspects, additional cuts and/or asymmetric cuts may be added to the patterned conductive layer to achieve further coupling uniformity. The added patterned conductive layer can include conductive strips that cover an outline of conductive areas of the patterned conductive layer to capture flux generated by the PTU coil and carry the proper Eddy current. Further, the added patterned conductive layer may be grounded or otherwise mechanically/electrically coupled to the housing of the PRU coil at one or more strategic locations to achieve good electrostatic discharge (ESD) and/or electromagnetic interference (EMI) performance. PRU coil integration techniques are described in related U.S. patent application Ser. No. 14/864,452, which is incorporated by reference herein in its entirety.

EXAMPLES

Example 1 is a wireless charging device, comprising: a resonator including coil windings, the resonator configured to generate a magnetic field; and a feed point connected to an inner winding of the coil windings of the resonator, the feed point being configured to connect power to the resonator.

In Example 2, the subject matter of Example 1, further comprising: one or more tuning capacitors connected in series between the feed point and the coil windings.

In Example 3, the subject matter of Example 1, wherein the coil windings further comprise one or more in-line capacitors.

In Example 4, the subject matter of Example 1, wherein the feed point is connected to an innermost winding of the coil windings.

In Example 5, the subject matter of Example 1, wherein inner winding is surrounded by one or more other windings of the coil windings.

In Example 6, the subject matter of Example 1, wherein the coil windings are substantially concentrically arranged.

In Example 7, the subject matter of Example 1, wherein the resonator is configured to generate a larger current in the inner winding of the coil windings than an outer winding of the coil.

In Example 8, the subject matter of Example 7, wherein the resonator is configured to generate the larger current in the inner winding of the coil windings than the outer winding of the coil in the presence of one or more conductive surfaces positioned adjacent to the wireless charging device.

In Example 9, the subject matter of Example 1, wherein outer windings of the coil windings are configured to limit Eddy current generation in one or more conductive surfaces positioned adjacent to the wireless charging device.

Example 10 is a wireless charging device, comprising: a resonator including coil windings, the resonator configured to generate a magnetic field; and a feed point selectively connected to the coil windings of the resonator, the feed point being configured to connect power to the resonator, wherein the feed point is connected to: an inner winding of the coil in a first mode of operation, and an outer winding of the coil in a second mode of operation.

In Example 11, the subject matter of Example 10, wherein: the feed point comprises a first feed point and a second feed point; and in a third mode of operation, the first feed point is connected to the inner winding of the coil windings and the second feed point is connected to the outer winding of the coil windings.

In Example 12, the subject matter of Example 10, wherein the feed point is selectively connected to the coil windings of the resonator based on one or more characteristics of the wireless charging device or an associated power receiving unit.

In Example 13, the subject matter of Example 12, wherein the one or more characteristics comprise one or more of: the current of the resonator, a voltage induced in the power receiving unit, and a mutual impedance between the wireless charging device and the power receiving unit.

In Example 14, the subject matter of Example 10, wherein the feed point is selectively connected to the coil windings of the resonator based on a control signal received by the wireless charging device.

In Example 15, the subject matter of Example 10, further comprising: one or more tuning capacitors connected in series between the feed point and the coil windings.

In Example 16, the subject matter of Example 10, wherein the coil windings further comprise one or more in-line capacitors.

In Example 17, the subject matter of Example 10, wherein the coil windings are substantially concentrically arranged.

In Example 18, the subject matter of Example 10, wherein the resonator is configured to generate a larger current in the inner winding of the coil windings than an outer winding of the coil.

In Example 19, the subject matter of Example 18, wherein the resonator is configured to generate a larger current in the inner winding of the coil windings than an outer winding of the coil in the presence of one or more conductive surfaces positioned adjacent to the wireless charging device.

In Example 20, the subject matter of Example 10, wherein outer windings of the coil windings are configured to limit Eddy current generation in one or more conductive surfaces positioned adjacent to the wireless charging device.

Example 21 is a power transmitting unit (PTU), comprising: a resonator including coil windings having an inner winding and an outer winding, the resonator configured to generate a magnetic field to inductively couple with a power receiving unit (PRU), wherein the outer winding of the coil windings is configured to limit Eddy current generation in one or more conductive surfaces positioned adjacent to the PRU; and a feed point selectively connected to the coil windings of the resonator, wherein the feed point is connected to: the inner winding of the coil in a first mode of operation, the inner winding having a larger current than the outer winding; and the outer winding of the coil in a second mode of operation.

In Example 21, the subject matter of Example 21, wherein: the feed point comprises a first feed point and a second feed point; and in a third mode of operation, the first feed point is connected to the inner winding of the coil windings and the second feed point is connected to the outer winding of the coil windings.

In Example 23, the subject matter of any of Examples 1 and 2, wherein the coil windings further comprise one or more in-line capacitors.

In Example 24, the subject matter of any of Examples 1-3, wherein the feed point is connected to an innermost winding of the coil windings.

In Example 25, the subject matter of any of Examples 1-4, wherein inner winding is surrounded by one or more other windings of the coil windings.

In Example 26, the subject matter of any of Examples 1-5, wherein the coil windings are substantially concentrically arranged.

In Example 27, the subject matter of any of Examples 1-6, Wherein the resonator is configured to generate a larger current in the inner winding of the coil windings than an outer winding of the coil.

In Example 28, the subject matter of Example 27, wherein the resonator is configured to generate the larger current in the inner winding of the coil windings than the outer winding of the coil in the presence of one or more conductive surfaces positioned adjacent to the wireless charging device.

In Example 29, the subject matter of any of Examples 1-8, wherein outer windings of the coil windings are configured to limit Eddy current generation in one or more conductive surfaces positioned adjacent to the wireless charging device.

Example 30 is a power transmitting unit comprising the wireless charging device of any of Examples 1-20.

Example 31 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

What is claimed is:

1. A wireless charging device, comprising:
   a resonator having an inline capacitor and coil windings that include an inner winding having first and second inner coupling points and an outer winding having first and second outer coupling points, the resonator configured to generate a magnetic field; and
   a controller that is configured to control a selective connection of:
   in a first mode of operation, the first and second inner coupling points of the inner winding to a power source to power to the resonator, and the first outer coupling point to the second outer coupling point via the inline capacitor; and
   in a second mode of operation, the first and second outer coupling points of the outer winding to the power source to power the resonator, and the first inner coupling point to the second inner coupling point via the inline capacitor.

2. The wireless charging device of claim 1, further comprising:
   one or more tuning capacitors connected in series between the power source and the coil windings.

3. The wireless charging device of claim 1, wherein the inner winding is an innermost winding of the coil windings and the outer winding is an outermost winding of the coil windings.

4. The wireless charging device of claim 1, wherein the outer winding of the coil windings has a higher impedance than the inner winding.

5. The wireless charging device of claim 1, wherein the coil windings are substantially concentrically arranged.

6. The wireless charging device of claim 1, wherein the resonator is configured to generate a larger current in the inner winding of the coil windings than the outer winding of the coil.

7. The wireless charging device of claim 6, wherein the resonator is configured to generate the larger current in the inner winding of the coil windings than the outer winding of the coil in the presence of one or more conductive surfaces positioned adjacent to the wireless charging device.

8. The wireless charging device of claim 1, wherein the outer winding is configured to limit Eddy current generation in one or more conductive surfaces positioned adjacent to the wireless charging device.

9. The wireless charging device of claim 1, wherein:
   the inner winding has a larger current than the outer winding of the coil.

10. The wireless charging device of claim 1, wherein the controller is configured, based on one or more characteristics of the wireless charging device or an associated power receiving unit, to control the selective connection of the feed points to the inner and the outer coupling points and the selective connection of the inner and the outer coupling points to the inline capacitor.

11. The wireless charging device of claim 1, wherein the selective connection of the first and second inner coupling points and the first and second outer coupling points to the power source is a physical connection.

12. A wireless charging device, comprising:
    a resonator having an inline capacitor and coil windings that include an inner winding having first and second inner coupling points and an outer winding having first and second outer coupling points, the resonator configured to generate a magnetic field; and
    selectively configured feed points connectable to: (a) the first and the second inner coupling points and (b) the first and the second outer coupling points of the resonator, the feed points being configured to connect power to the resonator,
    wherein:
    in a first mode of operation, the first and the second inner coupling points of the inner winding of the coil are connected to a power source to connect the power to the resonator, and the first outer coupling point is connected to the second outer coupling point via the inline capacitor;
    in a second mode of operation, the first and the second outer coupling points of the outer winding of the coil are connected to the power source to connect the power to the resonator, and the first inner coupling point is connected to the second inner coupling point via the inline capacitor; and
    in a third mode of operation, the first and the second inner coupling points and the first and second outer coupling points are connected to the power source.

13. The wireless charging device of claim 12, wherein the feed points are selectively connected based on one or more characteristics of the wireless charging device or an associated power receiving unit.

14. The wireless charging device of claim 13, wherein the one or more characteristics comprise one or more of: the current of the resonator, a voltage induced in the power receiving unit, and a mutual impedance between the wireless charging device and the power receiving unit.

15. The wireless charging device of claim 12, wherein the feed points are selectively connected based on a control signal received by the wireless charging device.

16. The wireless charging device of claim 12, further comprising:
one or more tuning capacitors connected in series between the power source and the coil windings.

17. The wireless charging device of claim 12, wherein the coil windings are substantially concentrically arranged.

18. The wireless charging device of claim 12, wherein the resonator is configured to generate a larger current in the inner winding of the coil windings than an outer winding of the coil.

19. The wireless charging device of claim 18, wherein the resonator is configured to generate a larger current in the inner winding of the coil windings than an outer winding of the coil in the presence of one or more conductive surfaces positioned adjacent to the wireless charging device.

20. The wireless charging device of claim 12, wherein outer windings of the coil windings are configured to limit Eddy current generation in one or more conductive surfaces positioned adjacent to the wireless charging device.

21. A power transmitting unit (PTU), comprising:
a resonator including an inline capacitor and coil windings having an inner winding with first and second inner coupling points and an outer winding with first and second outer coupling points, the resonator configured to generate a magnetic field to inductively couple with a power receiving unit (PRU), wherein the outer winding of the coil windings is configured to limit Eddy current generation in one or more conductive surfaces positioned adjacent to the PRU; and
selectively configured feed points connectable to: (a) the first and the second inner coupling points and (b) the first and second outer coupling points of the resonator, wherein:
in a first mode of operation, the first and the second inner coupling points of the inner winding of the coil are connected to a power source to connect the power to the resonator, and the first outer coupling point is connected to the second outer coupling point via the inline capacitor, the inner winding having a larger current than the outer winding; and
in a second mode of operation, the first and the second outer coupling points of the outer winding of the coil are connected to the power source to connect the power to the resonator, and the first inner coupling point is connected to the second inner coupling point via the inline capacitor.

22. The PTU of claim 21, wherein:
in a third mode of operation, the first and the second inner coupling points of the inner winding of the coil windings and the first and the second outer coupling points of the outer winding of the coil windings are connected to the power source.

* * * * *